US012204881B2

(12) United States Patent
Zhang

(10) Patent No.: US 12,204,881 B2
(45) Date of Patent: Jan. 21, 2025

(54) DYNAMICALLY APPLYING PROFILE-GUIDED OPTIMIZATION TO A DBMS

(71) Applicant: Salesforce, inc., San Francisco, CA (US)

(72) Inventor: Rui Zhang, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 107 days.

(21) Appl. No.: 18/061,897

(22) Filed: Dec. 5, 2022

(65) Prior Publication Data

US 2024/0184550 A1    Jun. 6, 2024

(51) Int. Cl.
    *G06F 8/41*            (2018.01)
    *G06F 9/455*           (2018.01)

(52) U.S. Cl.
    CPC .......... *G06F 8/443* (2013.01); *G06F 9/45533* (2013.01)

(58) Field of Classification Search
    CPC .............................. G06F 8/443; G06F 9/45533
    See application file for complete search history.

(56) References Cited

U.S. PATENT DOCUMENTS

| | | | | |
|---|---|---|---|---|
| 6,219,825 B1 * | 4/2001 | Burch | .................. | G06F 8/4442 717/158 |
| 6,460,178 B1 * | 10/2002 | Chan | .................. | G06F 9/44521 717/146 |
| 7,013,456 B1 * | 3/2006 | Van Dyke | ........... | G06F 9/45533 714/39 |
| 11,481,482 B2 * | 10/2022 | Mookken | ................ | G06F 21/51 |
| 2008/0256524 A1 * | 10/2008 | Saraswati | ........... | G06F 12/0862 711/E12.001 |
| 2010/0114915 A1 * | 5/2010 | Gorton, Jr. | .............. | G06F 8/443 707/752 |
| 2012/0167057 A1 * | 6/2012 | Schmich | ............ | G06F 11/3644 717/130 |
| 2016/0062868 A1 * | 3/2016 | Mani | ................... | G06F 11/3466 717/130 |
| 2017/0351499 A1 * | 12/2017 | Ji | ............................ | G06F 8/443 |
| 2019/0370269 A1 * | 12/2019 | Bogdan | ................... | G06F 8/457 |
| 2021/0049465 A1 * | 2/2021 | Bogdan | ................... | G06N 3/045 |
| 2022/0137987 A1 * | 5/2022 | Chen | ................... | G06F 9/44521 719/331 |

(Continued)

FOREIGN PATENT DOCUMENTS

CN               109597619 A    *    4/2019

*Primary Examiner* — Daxin Wu
(74) *Attorney, Agent, or Firm* — Holland & Hart LLP

(57) ABSTRACT

An application server may identify a set of functions for the source code associated with an uninterruptable software service. In some examples, the subset of the set of functions may include one or more functions having a computational expense greater than a threshold. The application server may create a compilation template to compile a subset of the set of functions to a shared library, and may perform an instrumentation to identify the subset of the set of functions based on the shared library. The application server may create an optimized version of the shared library based on performing the instrumentation. The application server may then change one or more portions of the source code to repoint to the optimized version of the shared library based on creating the optimized version of the shared library.

20 Claims, 10 Drawing Sheets

(56) References Cited

U.S. PATENT DOCUMENTS

2023/0251838 A1* 8/2023 Drepper ................. G06F 8/443
                                                      717/153
2024/0134666 A1* 4/2024 Jaeger ................. G06F 12/1475

* cited by examiner

DYNAMICALLY APPLYING PROFILE-GUIDED OPTIMIZATION TO A DBMS

FIELD OF TECHNOLOGY

The present disclosure relates generally to database systems and data processing, and more specifically to techniques for dynamically applying profile-guided optimization.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales. In some examples, cloud platforms may support one or more software programs. In some instances, runtime for such programs may be optimized.

DETAILED DESCRIPTION

Figure 1:
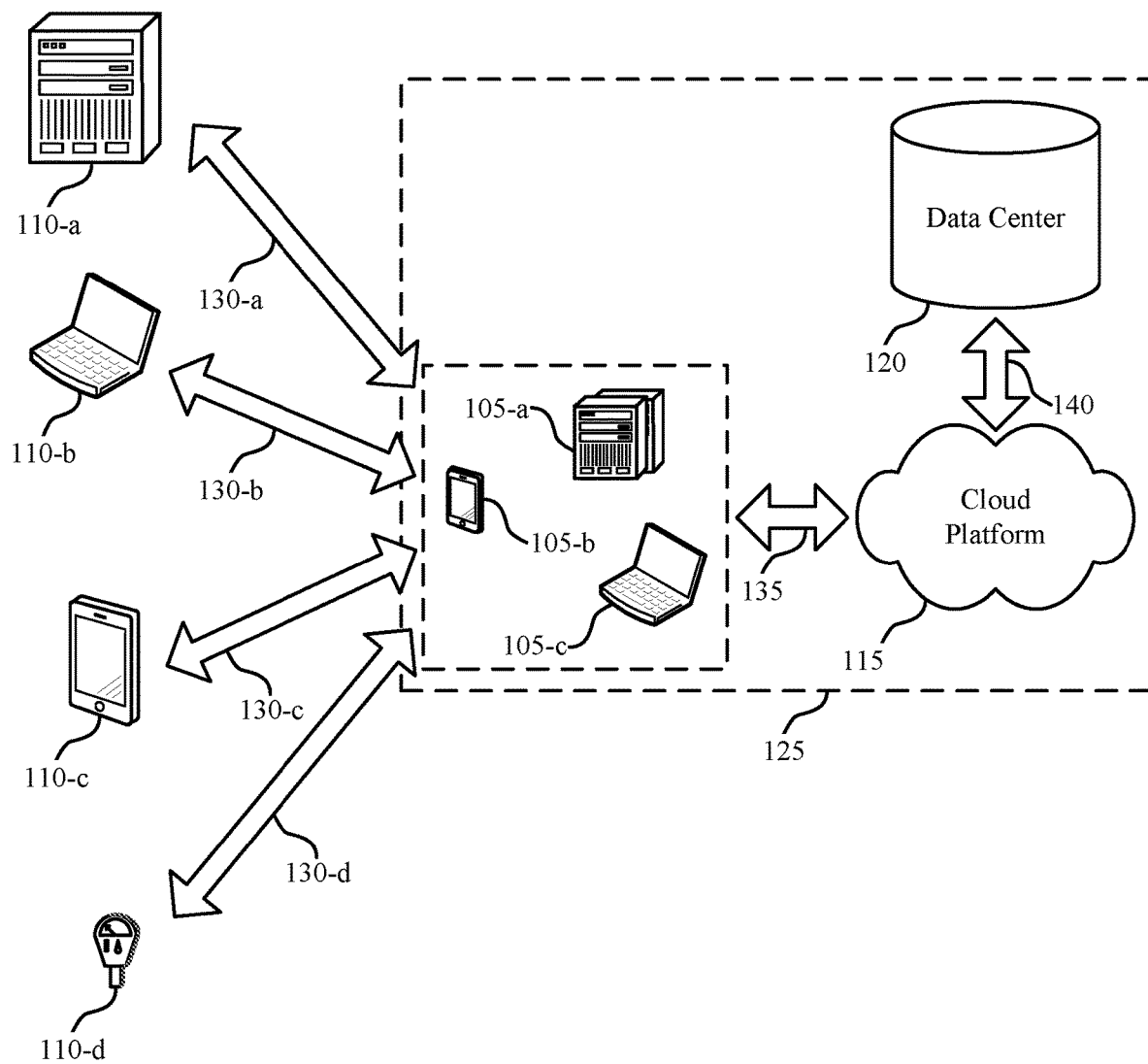
FIG. 1 illustrates an example of a method for optimizing runtime system that supports techniques for dynamically applying profile-guided optimization in accordance with aspects of the present disclosure.

Profile-guided optimization is a technology that improves the runtime performance of a program for a particular workload. Profile-guided optimization may generally compile the source code of a program twice to improve the run-time performance. For the first compilation, profile-guided optimization may collect execution statistics by executing a binary under a workload, where this binary may contain instrumentation mechanisms that automatically record and generate the execution statistics. The second compilation consumes collected profile data and applies further optimizations to the program source code to generate a final binary. Executing this final binary under the same workload produce significant speedup at runtime. Profile-guided optimization may be applied to a database management system engine to improve its efficiency in executing certain workloads. For database management system supporting a Software as a Service (SaaS) environment, conventional profile-guided optimization may not be suitable, as the software service not only operates continuously, but the workloads running in the service can change from time to time, rendering the statically-created software binaries suboptimal for the changing workloads. Such environments may be referred to as uninterruptable software services.

One or more aspects of the present disclosure provide for a technique for implementing profile-guided optimization for SaaS. For a database management system, that is deployed in a cloud environment, the techniques depicted herein may provide for implementing profile-guided optimization by identifying execution hotspots on a wide variety of workloads and traffic. The execution hotspots may include functions or portions of the software code that are executed more often than the rest of the code, and thus employ a large amount of computational resources. Such execution hotspots may be a small set of functions in the database engine, located in a small set of source files. In some examples, these hotspots may include data-fetching routines that may read data from database tables, expression evaluation operators, and operators that evaluate stored procedure constructs. Given that the majority of the execution time for a particular piece of code is spent in these hotspot functions, optimizing just these functions, instead of the entire source code of the engine, can be effective in improving the overall performance.

To optimize the set of hotspot functions, the techniques depicted herein employ a profile-guided optimization on the set of hotspot functions and source files, which can significantly reduce the compilation overhead. To effectively compile the hotspot functions, a system (e.g., an application server) may identify a set of functions in a SaaS environment that are classified as hotspot functions. At compile time, the system may select the set of hotspot functions to be compiled to a shared library that is then at runtime, loaded by the service and used to perform instrumentation. This instrumentation-enabled shared library consists of the same selected hotspot functions. When these functions are executed, profile data can be automatically collected. The system then creates an optimized version of the shared library based on the instrumentation and performs a change in the database engine process(es) to repoint the set of hotspot to the optimized version. Thus, applying profile-guided optimization in SaaS environment minimizes compilation overhead at runtime and further enables the possibility of applying profile-guided optimization in an iterative and adaptive fashion.

Aspects of the disclosure are initially described in the context of an environment supporting an on-demand database service. Aspects of the disclosure are further illustrated by and described with reference to computing systems. Aspects of the disclosure are further illustrated by and described with reference to apparatus diagrams, system diagrams, and flowcharts that relate to techniques for dynamically applying profile-guided optimization.

FIG. 1 illustrates an example of a system 100 for cloud computing that supports techniques for dynamically applying profile-guided optimization in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

Profile-guided optimization is a compiler optimization technique in computer programming that uses profiling to drive advanced program optimizations to improve program runtime performance. In some instances, profile-guided optimization may include technology that is often employed to improve the execution performance of a program for a particular workload. Profile-guided optimization can be applied to a database management system engine to improve its efficiency in executing certain workloads. In some instances, uses of profile-guided optimization may use substantial infrastructure support and manual steps to compile the database management system source code multiple times with different compiler options. As such, this technology may not be suitable for a SaaS environment, where the software service not only operates continuously, but the workloads running in the service can change from time to time. The changing workloads may render one or more statically-created software binaries suboptimal. In some cases, for a database management system engine, the execution hotspots may often be located within a small set of source files, in specific functions.

Techniques depicted herein provide for separately compiling the hotspot functions instead of recompiling the entire database management system engine. Additionally or alternatively, the hotspot functions may be optimized with profile-guided optimization to increase the efficiency of the hotspot functions. Further, with a small set of source files being selected to apply profile-guided optimization, when changes in the workload patterns are observed, this set of files can be adaptively-recompiled with profile data collected when executing the new workload. Thus, the adaptive profile-guided optimization application strategy depicted herein minimizes compilation overhead at runtime and can be applied dynamically to a software service without interrupting the service.

In some examples, for a database management system, that is deployed in the cloud, taking a wide variety of workloads and traffic, an application server may observe one or more execution hotspots in a set of functions in the database management system engine, located in a set of source files. In some examples, these hotspots may include data-fetching routines that read data from database tables, expression evaluation operators, and operators that evaluate stored procedure constructs. Depending on the types of workloads, the time spent executing these code components can vary, but, in some examples, such workloads may be expensive functions during execution. Given that the majority of the execution time is spent in these hotspot functions, optimizing just these functions, instead of the entire engine, can be effective in improving the overall performance. Thus, the techniques of the present disclosure describe applying profile-guided optimization to the small set of functions and source files, which can significantly reduce the compilation overhead. Minimizing the compilation overhead at runtime further enables the possibility of applying profile-guided optimization in an iterative and adaptive fashion. A different workload may lead to a particular set of functions to run hotter (have a greater execution time) than under the previous workload. In such cases, the application server can then adaptively (re)apply the profile-guided optimization to the exposed set of functions.

According to one or more aspects, an application server may identify a set of functions for the source code associated with an uninterruptable software service and may create a compilation template to compile a subset of the set of functions to a shared library. The application server may perform an instrumentation to identify the subset of the set of functions based on the shared library and may create an optimized version of the shared library based on performing the instrumentation. The database management system developer may then change one or more portions of the source code to let the runtime database management system process repoint the hotspot functions to the optimized version of the shared library based on creating the optimized version of the shared library.

The aspects depicted herein provide for identifying a subset of hotspot functions in software that is running as services. For a database management system engine, in which runtime hotspots are often associated with a small set of functions, the techniques of the present disclosure effectively organize these hotspots into a separate compilation pipeline that performs runtime instrumentation, profile generation, and code optimization, in an iterative manner, thereby achieving a demand-driven adaptive code optimization and generation scheme that is practical and easily deployable in a SaaS infrastructure running in the cloud.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
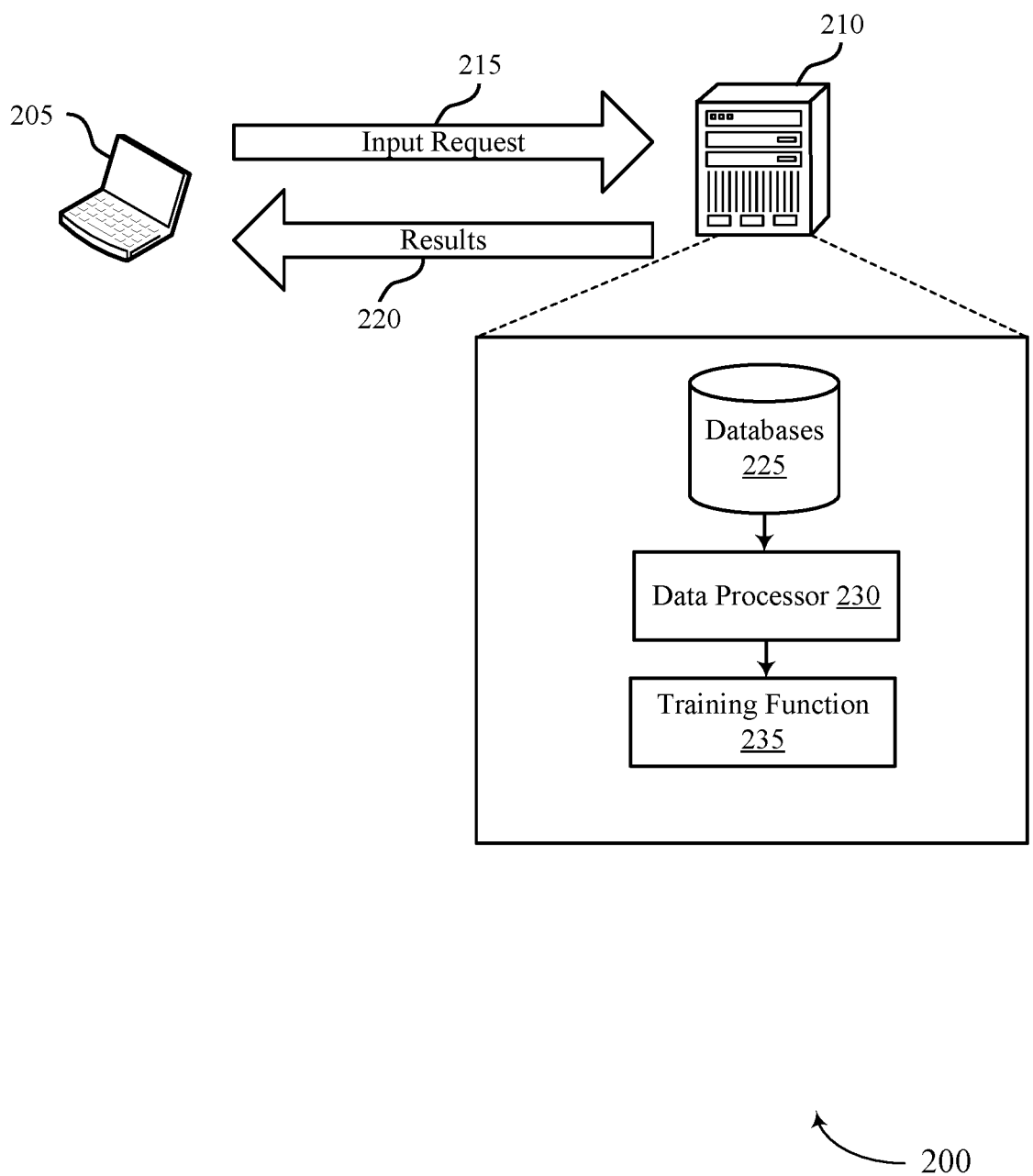
FIG. 2 illustrates an example of a computing system that supports techniques for dynamically applying profile-guided optimization in accordance with aspects of the present disclosure.

FIG. 2 illustrates an example of a computing system 200 that supports techniques for dynamically applying profile-guided optimization in accordance with aspects of the present disclosure. The computing system 200 includes a user device 205 and a server 210. The user device 205 may be example of a device associated with a cloud client 105 or contact 110 of FIG. 1. The server 210 may be examples of aspects of the cloud platform 115 and the data center 120 of FIG. 1. For example, the server 210 may represent various devices and components that support an analytical data system as described herein. The server 210 may support a multi-tenant database system, which may manage various databases 225 that are associated with specific tenants (e.g., cloud clients 105). The server 210 may also support running a SaaS in response to an input request 215 received from user devices, such as user device 205. The data retrieved in response to a input request 215 may be surfaced to a user at the user device 205 as results 220.

As described, the server 210 may manage various databases 225 that are associated with specific tenants. In some cases, the databases 225 may be associated with a SaaS running on the server 210. For example, a database 225 (or other datastore) may store a set of datasets that are associated with the tenant corresponding to user device 205. To support dynamically applying profile-guided optimization described herein, a data preprocessor 230 may identify a subset of a set of functions as hotspot functions. The data preprocessor 230 may create an optimized version of a shared library using a training function 235. For example, the training function 235 may include a set of possible hotspot functions and the data preprocessor 230 may select a subset of the functions to be complied for a given workload.

According to one or more aspects of the present disclosure, profile-guided optimization may include a compiler optimization technique to improve the runtime performance of a program for a particular workload. This technique may work by compiling the program source code twice, typically by applying first the "profile-generate" and then by applying one or more "profile-use" options in the compilation commands. For the first compilation, a compiler included in the server 210 may emit an instrumentation logic, embedded in a generated binary, such that when this binary is executed under a workload, execution statistics are collected by the instrumentation logic and are written to disk when the program terminates. The second compilation (with profile-use) may consume the collected profile data and may apply further optimizations to the program to generate a more efficient binary. When the server 210 executes the final binary is executed under the same workload, significant speedup can be expected at runtime.

The server 210 may apply profile-guided optimization to a database management system codebase to produce efficient binaries for frequently-exercised workloads. In some examples, the profile-guided optimization may take advantage of runtime information collected during execution, such as the number of times a function is executed, a most-frequently invoked call from an indirect call-site, the number of iterations of a loop, enabling the server 210 to apply further program optimizations to the database management system source code to improve the runtime performance. However, profile-guided optimization may be applicable at database management system at development/compile time, as performing profile-guided optimization may use an entire source tree of the database management system. In addition, profile-guided optimization may introduce significant compilation overhead, as the source code is compiled multiple times. Further, when different workloads are executed, the training function 235 may create different binaries, each corresponding to a specific workload. In some cases, profile-guided optimization may be an impractical option to improve the performance of a database management system deployed as a continuously-running software service.

For a database management system, such as at databases 225, taking a wide variety of workloads and traffic, the training function 235 may observe execution hotspots in a small set of functions, located in a small set of source files. These hotspots may include data-fetching routines that read data from database tables, expression evaluation operators, and operators that evaluate stored procedure constructs. Depending on the types of workloads, the time spent in these code components can vary, but they are more expensive functions during execution.

Given that the majority of the execution time is spent in these hotspot functions, the server 210 optimizes just these functions, instead of the entire engine, and such techniques can be effective in improving the overall performance. Aspects depicted herein provide for the server 210 applying profile-guided optimization to a small set of functions and source files, which can significantly reduce the compilation overhead. Minimizing the compilation overhead at runtime further enables the possibility of applying profile-guided optimization in an iterative and adaptive fashion.

In order to apply profile-guided optimization, the server 210 may identify whether a source code is available. In some examples, the server 210 may facilitate shipping of a database management system source code into one or more production/deployment environments. An alternative solution for applying the profile-guided optimization may be to rely on a low level virtual machine (LLVM) intermediate representation (IR) of the database management system code, rather than the source code itself. The LLVM IR may allow program optimizations to be directly carried out without accessing the source code (e.g., C source code). In addition, the LLVM infrastructure may facilitate the profile instrumentation logic to be built in the IR, such that the entire profile-guided optimization pipeline is built on the IR of the hotspot functions.

According to one or more aspects depicted herein, the server 210 may identify a set of functions for the source code associated with an uninterruptable software service. For example, the server 210 may identify a set of functions for a database manager service source code. The set of functions for the source code may be included in the databases 225. In some examples, the server 210 may create a compilation template to compile a subset of the set of functions to a shared library. The server 210 may create an LLVM IR file for the source code associated with the uninterruptable software service. The server 210 may then include the LLVM IR file generated from the source code in the compilation template. In some examples, the server 210 may perform an instrumentation to identify the subset of the set of functions based on the shared library. Performing the instrumentation may be based on including the LLVM IR file for the source code in the compilation template. In some examples, the server 210 may create an optimized version of the shared library based on performing the instrumentation, and may change one or more portions of the source code to repoint to the optimized version of the shared library based on creating the optimized version of the shared library. In some examples, the server 210 may compile and link the LLVM IR file with profile data associated with the source code by incorporating an instrumentation logic into the LLVM IR file. In such cases, creating an optimized version of the shared library may be based on compiling and linking the LLVM IR file with the profile data.

Figure 3:
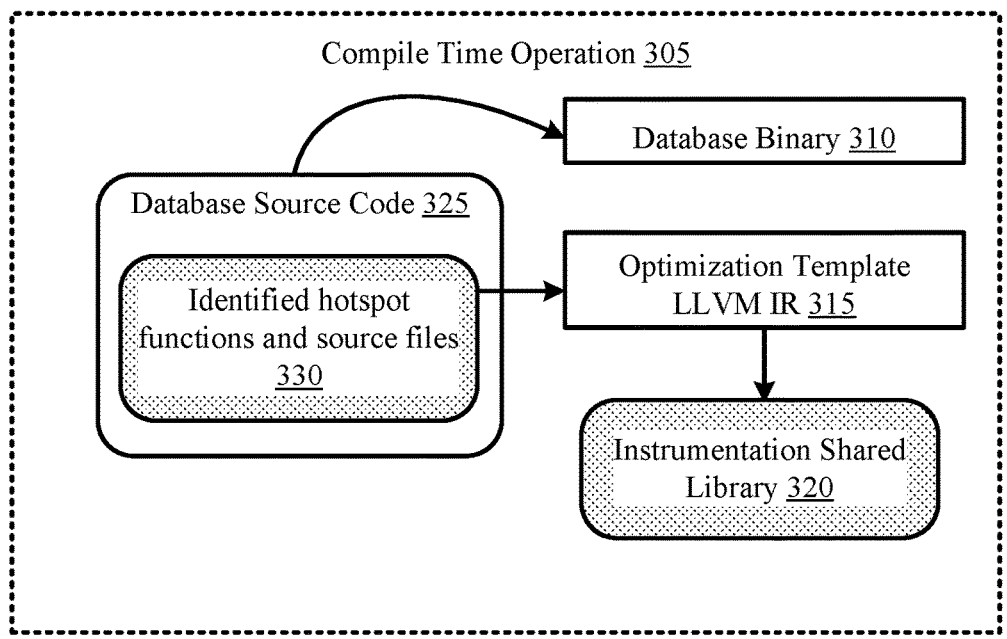
FIG. 3 illustrates an example of a system architecture that supports techniques for dynamically applying profile-guided optimization in accordance with aspects of the present disclosure.
Figure 3:
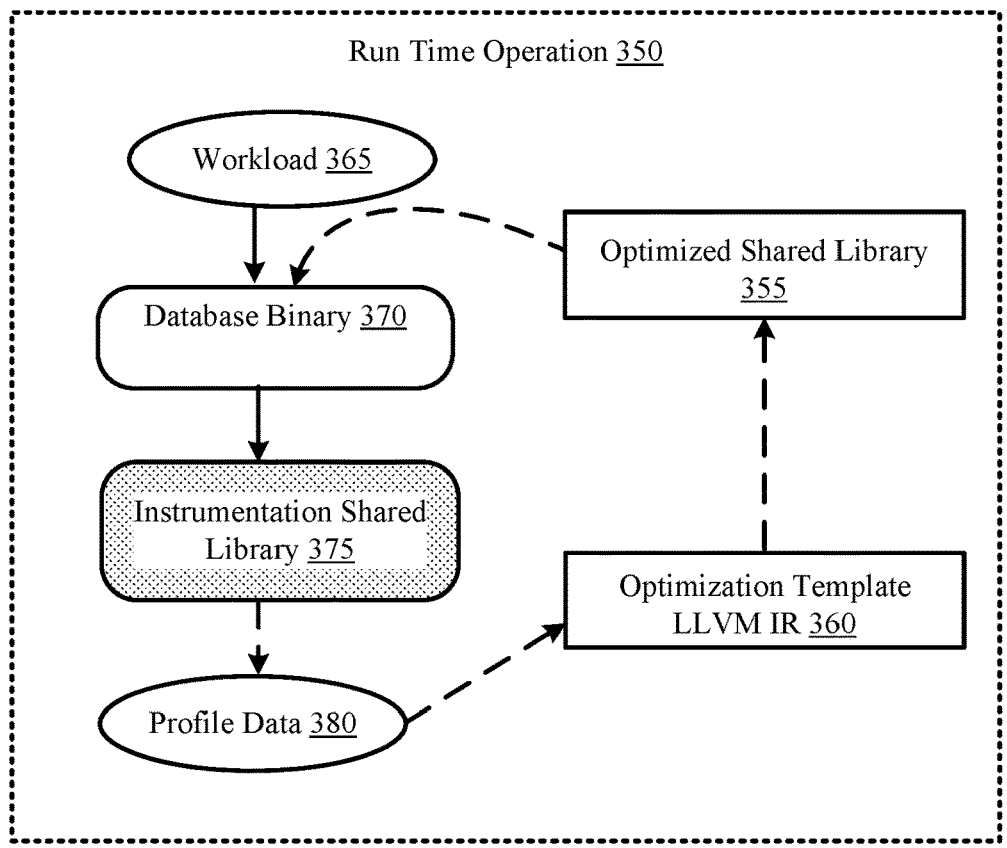

FIG. 3 illustrates an example of a system architecture 300 that supports techniques for dynamically applying profile-guided optimization in accordance with aspects of the present disclosure. The system architecture 300 may be implemented by a device (e.g., an application server) and a data store. In some cases, the functions performed by the device (such as application server) may instead be performed by a component of the data store. A user device (not shown) may support applying profile-guided optimization using machine learning models or other models. Specifically, a user device in combination with the application server may support an application that provides profile-guided optimization associated with uninterruptable software service.

According to one or more aspects of the present disclosure, applying profile-guided optimization may include a compile time operation 305 and a run time operation 350. In particular, deploying profile-guided optimization may use both compile time and run time. At compile time, an application server may select a set of hotspot functions. The set of hotspot functions may be selected to be compiled to a shared library (pgo_instrument.so) that is used to perform instrumentation for the executions of these functions and an LLVM IR file (optimization_template.bc), which can be compiled and linked along with profile data to generate the optimized binary (e.g., optimized binary for database binary 310). As depicted in the example of FIG. 3, the application server may identify a set of functions for the source code associated with an uninterruptable software service. The application server may create a compilation template to compile a subset of the set of functions to a shared library. In some examples, the application server may create an LLVM IR file (e.g., optimization template LLVM IR 315) for the source code associated with the uninterruptable software service and may include the LLVM IR file generated from the source code in the compilation template. The application server may compile both files using an LLVM compiler (e.g., clang).

In some examples, the application server may perform an instrumentation (via an instrumentation shared library 320) to identify the subset of the set of functions (e.g., hotspot functions and source files 330) based on the shared library. The application server may create an optimized version of the shared library based on performing the instrumentation. For instance, the application server may create the optimization_template.bc file including the LLVM IR representation for the selected hotspot functions. The application server may then create a shared library including the pgo_instrument.so file. The application server may create the shared library by linking the template IR file with the profile-generate option, which incorporates the instrumentation logic into the generated code by the compiler. The application server may install both files along with a database management system deployment package. In some examples, the LLVM-IR file may be termed a template because it may be used to generate both the instrumentation library (at database source code 325 compile time) and to generate the optimized code for the hotspots (at database source code 325 runtime).

During the run time operation 350, when the database management system engine starts executing a given workload, the engine may automatically engage a pipeline initiating profile-guided optimization. The application server may explicitly load a pgo_instrument.so (e.g., optimized shared library 355) via dlopen( ). The application server may then perform execution using the functions within a library. After a certain instrumentation period, the application server may unload the library via dlclose( ). The application server may collect instrumentation profile data 380 during this period. The application server may then write the instrumentation profile data 380 in a summary file on disk. In some examples, the application server may then invoke an LLVM code-generation API to compile and link the optimization_template.bc file (e.g., the optimization template LLVM IR 360) with the profile data 380, using the profile-use option. In some examples, the application server may perform the compiling and linking of the optimization_template.bc file while the engine is still running. Upon compiling and linking, the application server may generate an optimized shared library 355 including the same set of hotspot functions, but further optimized. The application server may then load the optimized shared library 355 by one or more backend processes that execute the workload 365.

As the database engine at the application server continues to serve database requests, the workload patterns for the workload 365 may shift or a new workload may start running. In such cases, the previously-created optimized library 355 may no longer be optimal for the new workload. In this case, a new version of the optimized library 355 may be created. The application server may create the new version of the optimized library 355 by reengaging the profile-guided optimization pipeline, with the steps depicted herein.

In some examples, the application server may use various libraries for the execution of the database engine and may implement a policy enacted to periodically engage the profile-guided optimization pipeline. In some examples, the application server may provide for resolving symbols in the loaded libraries. In some systems (e.g., Linux-based systems), the application server may load shared libraries (.so files) via the dlopen( ) function to load the libraries into the current running process's address space. The dynamic linker/loader in the operating system may perform runtime linking on the loaded symbols, such that when the running process invokes a function, which identified by a symbol, in the loaded library, the runtime address of this function is resolved by the loader and the call from the process can be directed to this address, to execute the function in the loaded library.

In the profile-guided optimization pipeline, the application server may rely on the pgo_instrument.so library (e.g., instrumentation shared library 375) to perform runtime instrumentation. As depicted herein, the instrumentation shared library 375 may include a set of functions that are also included in the database main binary (e.g., database binary 370). In other words, the same functions may appear both in the database binary 370 and in instrumentation shared library 375. The following may be an example of such function:

```
TupleTableSlot *
ExecNestLoop (PlanState *pstate)
{
    NestLoopStae *node = castNode (NestLoopState, pstate);
    outerPlan = outerPlanState (node);
    innerPlan = innerPlanState (node);
    ...
    for ( ; ; )
    {
        ...
        outerTupleSlot = ExecGetInputTuple (outerPlan, . . . );
        ...
        innerTupleSlot = ExecGetInputTuple (innerPlan, . . . );
        ...
    }
    ...
}
```

In some examples, the application server loads an instrumentation shared library 375 for performing the instrumentation to identify the subset of the set of functions in response to initiating execution of the source code. The instrumentation shared library 375 may include at least a set of functions that are also included in a primary version of the binary for the source code. In the example depicted herein, the function ExecNestLoop may be included in both database binary 370 and instrumentation shared library 375.

To facilitate instrumentation, the functions from the pgo_instrument.so library (e.g., optimized shared library 355) may be executed, instead of the same functions from the database binary 370. In some examples, symbols may be resolved by first looking within the main binary. If a symbol cannot be located in the main binary, it may then be resolved from the loaded shared library (e.g., optimized shared library 355). For the profile-guided optimization pipeline, the application server may first resolve symbols from the loaded library (e.g., optimized shared library 355). To support this, the application server may support a global function pointer for each such symbol, such that the function pointers can be reassigned with the desired function addresses at runtime. For instance, the application server may initiate a global pointer for a first address associated with a function in an original binary in the uninterruptable software service. The application server may then reassign the global pointer to a second address associated with the function in the optimized version of the shared library. In some examples, the application server may change one or more portions of the source code to repoint to the optimized version of the shared library based on reassigning the global pointer. The following depicts an exemplary code snippet supporting the symbol resolution scheme:

```
TupleTableSlot* (*ExecNestLoop_fn)(PlanState *pstate) =
   &ExecNestLoop;
void reassign_nodeNestloop_funcs(void* lib_handle)
{
   ExecNestLoop_fn = dlsym(lib_handle, "ExecNestLoop");
}
void restore_nodeNestloop_funcs(void)
{
   ExecNestLoop_fn = &ExecNestLoop;
}
...
TupleTableSlot* ExecNestLoop(PlanState *pstate)
{
   ...
}
```

For the ExecNestLoop( ) function, the application server may introduce a global function pointer, namely ExecNestLoop_fn, that is initialized to the address of the ExecNestLoop( ) function. This function pointer can be reassigned to a different address via the dlsym( ) call in the reassign_nodeNestloop_funcs( ) function. This function may be invoked when the pgo_instrument.so library is loaded. In such cases, the lib_handle pointer may reference the library handle returned by dlopen( ) invoked elsewhere in the database engine. After reassign_nodeNestloop_funcs( ) is executed, the ExecNestLoop_fn function pointer may point to the ExecNestLoop symbol that is located within the loaded library.

The ExecNestLoop( ) function may previously be directly-invoked by the application server using the database engine. In some cases, the application server may change such direct invocation to an indirect function-call to the ExecNestLoop_fn function pointer. Substituting a direct function call with an indirect one can result in some performance degradation at the callsite. However, with the potential that the ExecNestLoop( ) function being further optimized, this callsite overhead can become negligible.

In some examples, the application server may use the restore_nodeNestLoop_funcs( ) function to restore the ExecNestLoop_fn pointer to the original address of the ExecNestLoop( ) function located in the database main binary. The code addition depicted herein may be applied to each source file, in which at least one function symbol needs to be duplicated in the instrumentation library, as well as in the optimized library. In the database engine, a small number of such source files may be modified to include these helper routines.

The application server may use the techniques depicted herein to apply profile-guided optimization to nested functions. In some examples, a function may invoke other functions, and these functions can in turn invoke more functions. For instance, ExecNestLoop( ) may invoke ExecGetInputTuple( ). As long as the callee is included in the shared library, the callee function is invoked automatically from the same library, rather than from the database main binary. This may be because when compiling and linking the shared libraries, the symbols are resolved within the scope of the code included in the shared libraries themselves. As such, when a caller function and a callee function both are included in the library, the function call to the callee may be resolved (via dlsym( )) to the function symbol within the library. In some examples, the application server may not replace all the hotspot functions with function pointers. Instead, the application server may identify a "top" function, usually a function that is a hotspot or this function includes at least one hotspot function as a callee. All the relevant callee functions may be included in the instrumentation library along with this top function, such that its execution automatically instruments all the callee (hotspot) functions. Also, some callee functions may not be included in the same source file as the top function. In such cases, the application server may add the associated source files in a Makefile that builds the template LLVM-IR file, which may be linked to the instrumentation library. The following presents an example of nested function calls that involve multiple source files.

```
/* src1.c */
/*
 * Choose foo1( ) to be the top level function to instrument and optimize
 */
void (*foo1_fn) ( ) = &foo1;
void reassign_src1_funcs (void* lib_handle)
{
   foo1_fn = dlsym (lib_handle, "foo1");
}
void restore_src1_funcs( )
{
   foo1_fn = &foo1;
}
void foo1( )
{
   ...
   foo2 ( );
   ...
}
```

In some examples, foo2( ) may include the following code:

```
/* src2.c */
void foo2( )
{
   ...
   foo3( );
   ...
}
```

In some examples, foo3( ) may include the following code:

```
/* src3.c */
void foo3( )
{
   ...
```

```
bar( );
...
}
void bar( )
{
...
}
```

As this example illustrates, function foo1( ) in source file src1.c may be selected as the top level function to be included in the instrumentation library. This function invokes function foo2( ) which is located in src2.c. The foo2( ) function in turn invokes foo3( ) Finally, foo3( ) invokes bar( ). While foo1( ) as the top level instrumentation target function in this example, is specified via the reassign_src1_functs( ) function to have its runtime symbol resolved within the instrumentation library, as discussed herein, the foo2( ), foo3( ), and bar( ) functions may not be explicitly specified to be included in the instrumentation library. Instead, the application server may add associated source files in the Makefile rule that creates the instrumentation library, which bundles all these functions into the same library. As a result, during execution, all the relevant function symbols may be resolved from the same library as long as the foo1( ) function from this library is called in the first place.

In some examples, foo3( ) and bar( ) may both be hotspot functions, but neither foo1( ) nor foo2( ) may incur substantial execution overhead. In this case, the potential performance improvement may be realized by optimizing just the foo3( ) and bar( ) functions. The application server may select the preferable top level functions, according to the runtime characteristics of the functions. For instance, if a function is an isolated hotspot, that is, this function does not invoke other functions or its callees are negligible in terms of execution time, this function can be the top level function to be instrumented and optimized independently. On the other hand, if a few functions are all determined to be execution hotspots and they are all invoked by a particular caller function, then this caller function can be the top level function.

In some examples, the application server may engage the profile-guided optimization pipeline during the run time operation 350. Engaging the profile-guided optimization pipeline may include three steps, in which the first one performs a dlopen( ) on the instrumentation shared library 375 and then invokes various "reassign" routines, to swap the function pointers at runtime. The second step may be to let the instrumentation shared library 375 run for a certain period of time to collect profile data 380. The third step may include generating an optimized shared library 355 with the profile data 380.

In some examples, performing runtime instrumentation may induce non-trivial overhead, particularly because the instrumentation logic incorporated into the code may record and store execution information. In addition, at the end of the instrumentation period, the collected statistics may be written to disk to generate the optimized shared library 355. In some examples, the tasks may cause performance degradation. As such, the instrumentation (and the associated code generation) may be performed infrequently, with short duration, and may be performed by a limited number of database connections/backend processes, to minimize the overall impact on the execution latency.

Aspects depicted herein provide for a profile-guided optimization-engagement scheme as a candidate, based on one or more assumptions. For instance, the profile-guided optimization-engagement may be selected based on assuming that an application establishes many concurrent connections or backends to the database engine. In some examples, one or more of these backends execute primarily the same workload during the same period. In other words, the execution patterns observed on one backend may be indicative of the workload executed on a larger set of connections. In some examples, minor periodic performance degradation within a single backend may be acceptable as long as the overall performance from all the other backends is improved. In some examples, the workload patterns can change overtime. A specific backend (selected based on a particular backend ID) that is known to execute the application requests is chosen at runtime to perform the profile-guided optimization tasks. In some examples, this selected backend may monitor each incoming SQL statement and may determine if the application server is to perform profile-guided optimization instrumentation on the statement. In some examples, the incoming statements can be of different types, including regular DML (SELECT) statements, DDL statements, and utility commands. In some examples, the application server may configure a threshold to determine how many statements need to be instrumented. While a larger number of samples can exhibit more comprehensive execution characteristics, the longer instrumentation can slow down the execution of the statements. Therefore, the number of statements used in instrumentation may be chosen to be a few hundred, in some cases. In some examples, the number of statements may be a variable that's configurable for different workloads. For instance, if a first workload executes ten distinct statements, each for 1000 times, and a second workload that executes ten distinct statements sequentially, for 1000 times, then the system to instrument every other 1000 statement for the former and to instrument just 10 statements for the latter Finally, as the workload pattern shifts, the optimized shared library 355 may be regenerated to maximize the performance of SQL statement execution. The regeneration of the optimized library may use new profile data to be obtained via a reinstrumentation (using the same instrumentation library).

In some examples, using an old library may degrade performance, in that the previously-applied optimizations may not be optimal or even relevant under the new workload. An example of degradation may be an indirect function call. In a prior run, the indirect callsite may invokes a function foo( ). But in the new workload, this callsite may invokes another function bar( ) instead. As a result, with the new workload, the application server may apply optimizations to foo( ) and a branch prediction on this callsite may not be applicable in the new workload.

The application server may not detect the pattern shift in a workload or the execution of an entirely new workload in an automatic yet accurate manner, to trigger the reinstrumentation mechanism. Alternatively, the application server may detect the pattern shift in a workload or the execution of an entirely new workload in an automatic manner. In case where such automatic detection is not available, the application server may specify the reinstrumentation to take place for every tens of thousands of statement execution by a backend that is chosen to perform the profile-guided optimization pipeline tasks.

In some examples, the application server may create multiple optimized libraries during the execution of workloads. Once a new library is generated, the application server may notify the backends, such that the backends may load the new library. The application server may maintain a global version of the libraries to realize the notification mechanism. Each backend may also maintain a local copy of the library version. Once the profile-guided optimization performing backend generates a new version of the optimized library, this backend may synchronously increment the global version number. All the other backends, before executing each statement, may compare the locally-maintained version number with the global version. If the global version is advanced, the backend may unload the outdated library and then load the new library. Otherwise, the backend continues with its current library. The following code depicts a routine for executing an SQL statement with the profile-guided optimization pipeline.

```
executeStatement(statement, backend)
{
   instrumentation_performed ← false
   if (isBackendPGOApplier(backend) == true)
   {
      if (isDML(statement) == true
         and shouldEngagePGO( ) == true
         and instrument_count < instrument_threshold)
      {
      // This is the backend that is selected to apply PGO
      // and the statement is a DML statement
      // and the instrumentation count has not yet reached
      // the instrumentation threshold
      if (instrument_lib is Nil)
      {
         // If the instrumentation library hasn't been loaded,
         // load it here
         instrument_lib ← load(pgo_instrument.so)
      }
         // Resolve the relevant function pointers to symbols
         // from the loaded library
         reassignFunctionPointers(instrument_lib)
         instrument_count ← instrument_count + 1
         instrumentation_performed ← true
      }
      else if (isDML(statement) == false)
      {
         // If this statement is not a DML, (but the backend is still
         // the PGO Applier), restore the function pointers to the original
         // functions in the SDB binary, such that the execution does not
         // involve instrumentation
         restoreFunctionPointers( )
      }
   }
   else
   {
      // This is a backend that is not the PGO Applier. Load the latest
      // library if one is present
      if (local_lib_version < global_lib_version)
      {
         unload(optimized_lib)
         optimized_lib ← load(getOptimizedLibrary(global_lib_version))
         reassignFunctionPointers(optimized_lib)
         local_lib_version ← global_lib_version
      }
   }
   // Execute the statement as usual
   if (instrumentation_performed == true
      and instrument_count == instrument_threshold)
   {
      // If instrumentation is performed for the specified number
      // of times, unload the instrumentation library, which dumps
      // out the profile data, and then generate the optimized
      // library, and load it
      global_lib_version ← global_lib_version + 1
      unload(instrument_lib)
      instrument_lib < Nil
      generateOptimizedLibrary(pgo_template.bc, global_lib_version)
      optimized_lib = load(getOptimizedLibrary(global_lib_version))
      reassignFunctionPointers(optimized_lib)
   }
}
```

As depicted with reference to the routine for executing an SQL Statement with the profile-guided optimization pipeline, the shouldEngagePGO( ) routine may determine whether profile-guided optimization is to be reapplied. This routine may be designed to enable profile-guided optimization on every Nth execution of the statements, where N is a configurable value (e.g., set to 10000 as the default). The application server may also configure instrument_threshold value, set to a default value (e.g., 500). In some examples, the shouldEngagePGO( ) routine may be replaced with a more adaptive workload pattern-detection implementation.

Figure 4:
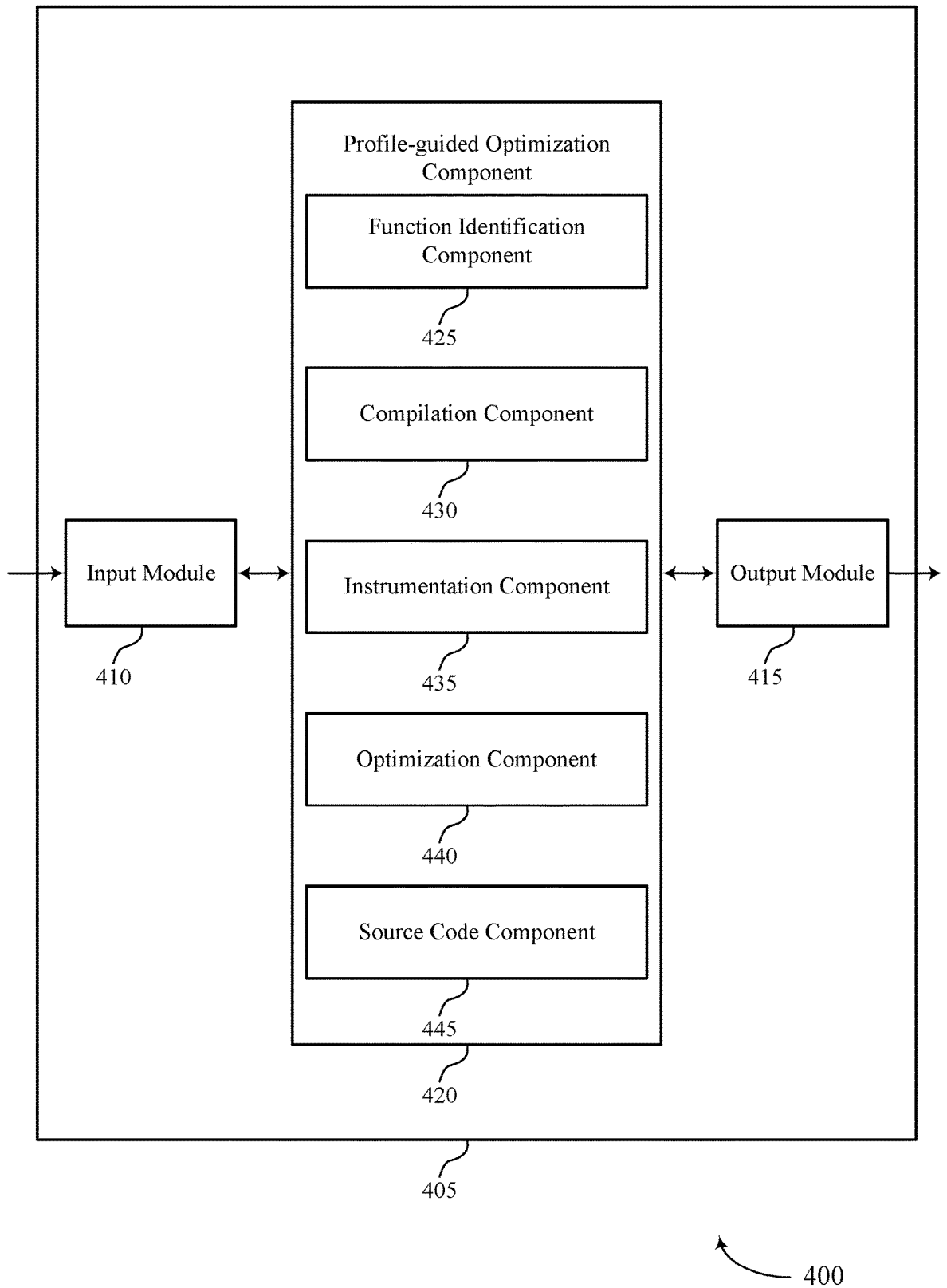
FIG. 4 illustrates a block diagram of an apparatus that supports techniques for dynamically applying profile-guided optimization in accordance with aspects of the present disclosure.

FIG. 4 illustrates a block diagram 400 of a device 405 that supports techniques for dynamically applying profile-guided optimization in accordance with aspects of the present disclosure. The device 405 may include an input module 410, an output module 415, and a profile-guided optimization component 420. The device 405 may also include a processor. Each of these components may be in communication with one another (e.g., via one or more buses).

The input module 410 may manage input signals for the device 405. For example, the input module 410 may identify input signals based on an interaction with a modem, a key board, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2R, UNIX®, LINUX®, or another known operating system to handle input signals. The input module 410 may send aspects of these input signals to other components of the device 405 for processing. For example, the input module 410 may transmit input signals to the profile-guided optimization component 420 to support techniques for dynamically applying profile-guided optimization. In some cases, the input module 410 may be a component of an I/O controller 610 as described with reference to FIG. 6.

The output module 415 may manage output signals for the device 405. For example, the output module 415 may receive signals from other components of the device 405, such as the profile-guided optimization component 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the profile-guided optimization component 420 may include a function identification component 425, a compilation component 430, an instrumentation component 435, an optimization component 440, a source code component 445, or any combination thereof. In some examples, the profile-guided optimization component 420, or various components thereof, may be configured to perform various operations (e.g., receiving, monitoring, transmitting) using or otherwise in cooperation with the input module 410, the output module 415, or both. For example, the profile-guided optimization component 420 may receive information from the input module 410, send information to the output module 415, or be integrated in combination with the input module 410, the output module 415, or both to receive information, transmit information, or perform various other operations as described herein.

The profile-guided optimization component 420 may support optimizing runtime for a source code in accordance with examples as disclosed herein. The function identification component 425 may be configured to support identifying a set of functions for the source code associated with an uninterruptable software service. The compilation component 430 may be configured to support creating a compilation template to compile a subset of the set of functions to a shared library. The instrumentation component 435 may be configured to support performing an instrumentation to identify the subset of the set of functions based on the shared library. The optimization component 440 may be configured to support creating an optimized version of the shared library based on performing the instrumentation. The source code component 445 may be configured to support changing one or more portions of the source code to repoint to the optimized version of the shared library based on creating the optimized version of the shared library.

Figure 5:
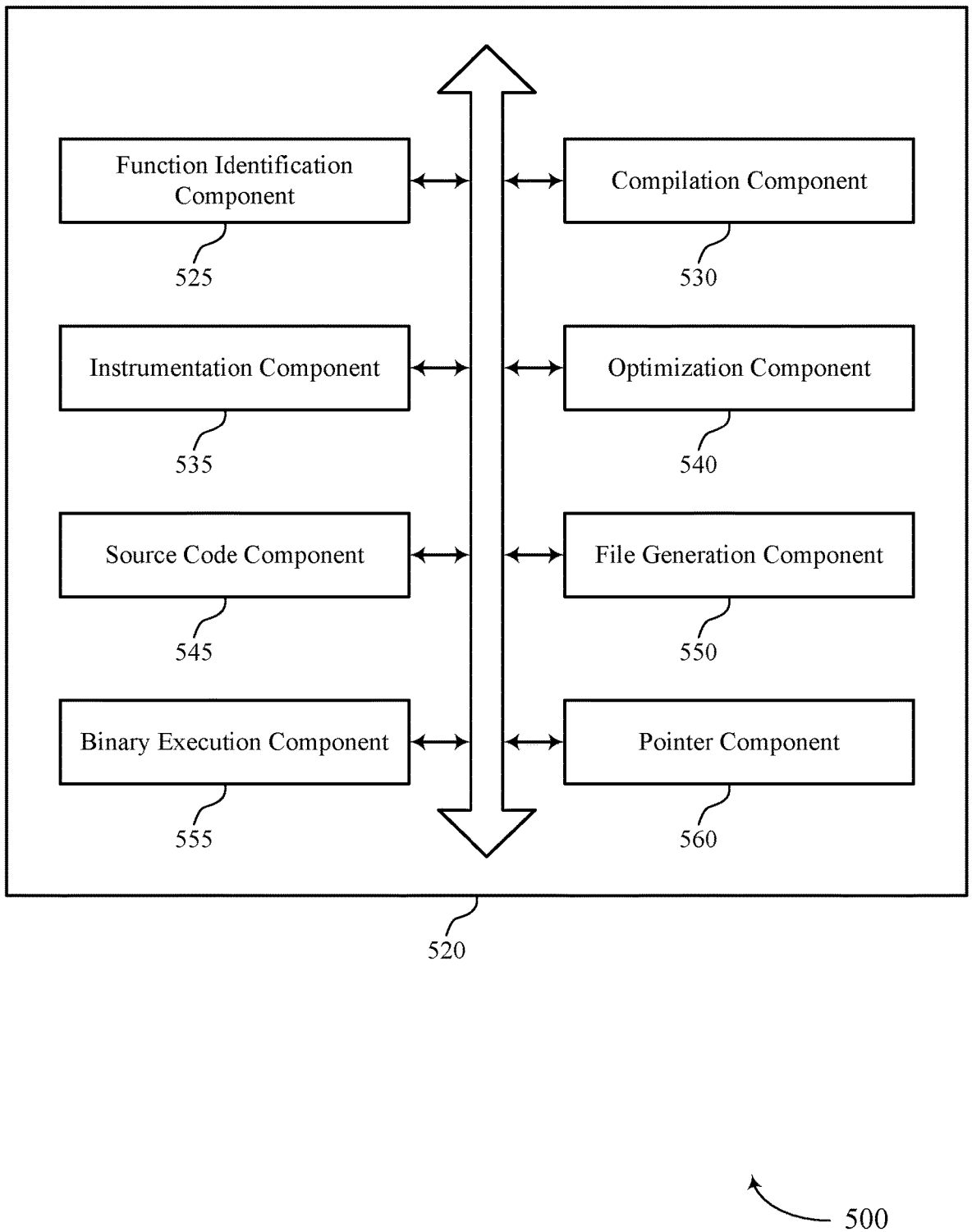
FIG. 5 illustrates a block diagram of a profile-guided optimization component that supports techniques for dynamically applying profile-guided optimization in accordance with aspects of the present disclosure.

FIG. 5 illustrates a block diagram 500 of a profile-guided optimization component 520 that supports techniques for dynamically applying profile-guided optimization in accordance with aspects of the present disclosure. The profile-guided optimization component 520 may be an example of aspects of a profile-guided optimization component or a profile-guided optimization component 420, or both, as described herein. The profile-guided optimization component 520, or various components thereof, may be an example of means for performing various aspects of techniques for dynamically applying profile-guided optimization as described herein. For example, the profile-guided optimization component 520 may include a function identification component 525, a compilation component 530, an instrumentation component 535, an optimization component 540, a source code component 545, a file generation component 550, a binary execution component 555, a pointer component 560, or any combination thereof. Each of these components may communicate, directly or indirectly, with one another (e.g., via one or more buses).

The profile-guided optimization component 520 may support optimizing runtime for a source code in accordance with examples as disclosed herein. The function identification component 525 may be configured to support identifying a set of functions for the source code associated with an uninterruptable software service. The compilation component 530 may be configured to support creating a compilation template to compile a subset of the set of functions to a shared library. The instrumentation component 535 may be configured to support performing an instrumentation to identify the subset of the set of functions based on the shared library. The optimization component 540 may be configured to support creating an optimized version of the shared library based on performing the instrumentation. The source code component 545 may be configured to support changing one or more portions of the source code to repoint to the optimized version of the shared library based on creating the optimized version of the shared library.

In some examples, the file generation component 550 may be configured to support creating an LLVM IR file for the source code associated with the uninterruptable software service. In some examples, the file generation component 550 may be configured to support including the LLVM IR file generated from the source code in the compilation template, where performing the instrumentation is based on including the LLVM IR file for the source code in the compilation template.

In some examples, the file generation component 550 may be configured to support compiling and linking the LLVM IR file with profile data associated with the source code by incorporating an instrumentation logic into the LLVM IR file, where creating the optimized version of the shared library is based on compiling and linking the LLVM IR file with the profile data.

In some examples, the binary execution component 555 may be configured to support initiating execution of a binary created from the source code associated with the uninterruptable software service. In some examples, the instrumentation component 535 may be configured to support loading an instrumentation library for performing the instrumentation to identify the subset of the set of functions in response to initiating execution of the source code. In some examples, the instrumentation library includes at least a set of functions that are also included in a primary version of the binary for the source code.

In some examples, the pointer component 560) may be configured to support initiating a global pointer for a first address associated with a function in an original binary in the uninterruptable software service. In some examples, the pointer component 560 may be configured to support reassigning the global pointer to a second address associated with the function in the optimized version of the shared library, where changing the one or more portions of the source code is based on reassigning the global pointer.

In some examples, the pointer component 560 may be configured to support reconfiguring the global pointer to point to the first address associated with the function. In some examples, the source code component 545 may be configured to support executing a binary and an instrumentation library created from the source code associated with the uninterruptable software service. In some examples, the source code component 545 may be configured to support receiving runtime information associated with a set of functions based on executing the binary and the instrumentation library. In some examples, the function identification component 525 may be configured to support identifying the subset of the set of functions. based on the runtime information.

In some examples, the runtime information includes at least one of a number of times a function is executed, a frequently invoked function call, a number of iterations of a loop, or a combination thereof. In some examples, the subset of the set of functions includes one or more functions having a computational expense greater than a threshold.

Figure 6:
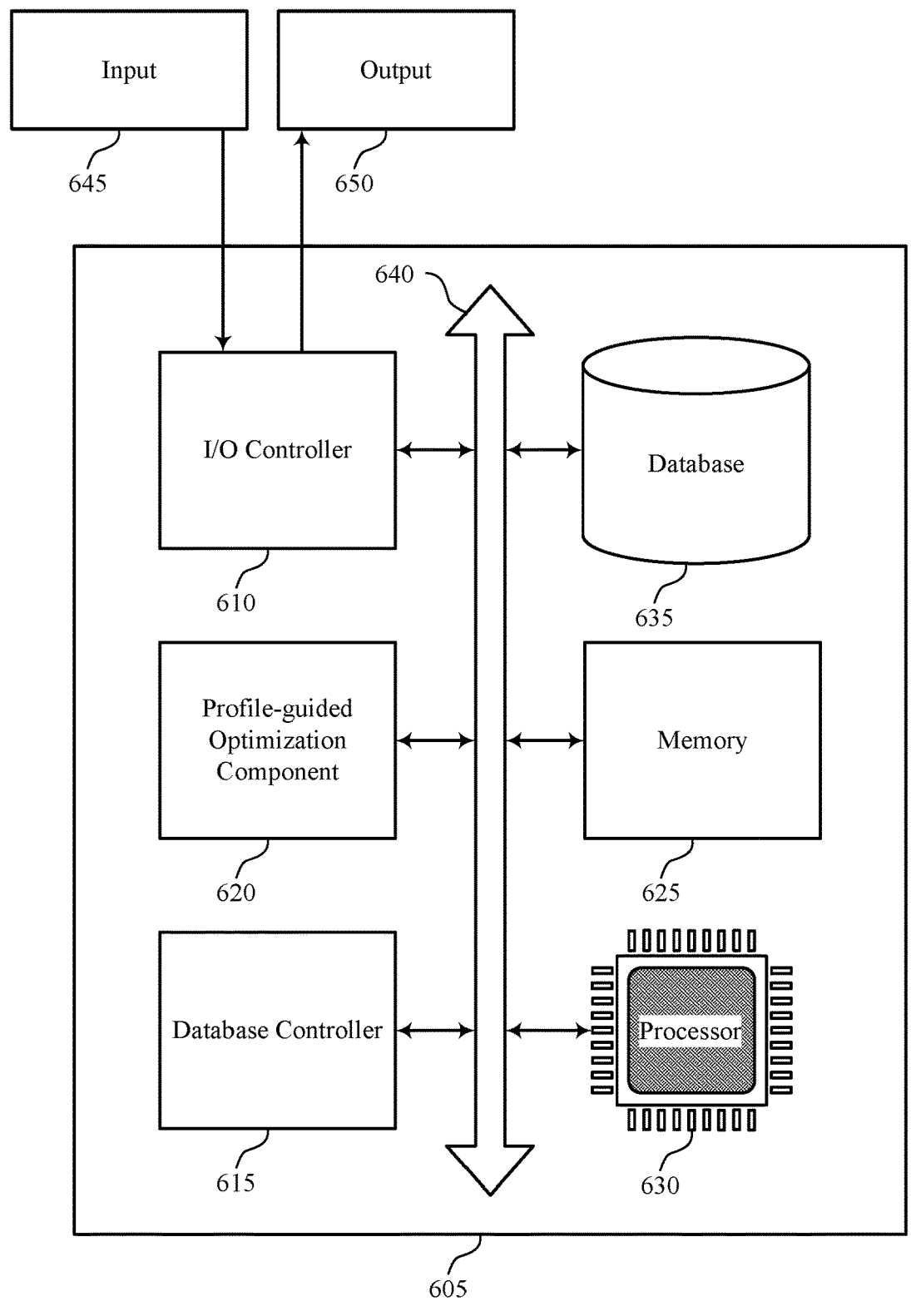
FIG. 6 illustrates a diagram of a system including a device that supports techniques for dynamically applying profile-guided optimization in accordance with aspects of the present disclosure.

FIG. 6 illustrates a diagram of a system 600 including a device 605 that supports techniques for dynamically applying profile-guided optimization in accordance with aspects of the present disclosure. The device 605 may be an example of or include the components of a device 405 as described herein. The device 605 may include components for bi-directional data communications including components for transmitting and receiving communications, such as a profile-guided optimization component 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device

605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2R, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a to perform various functions (e.g., functions or tasks supporting techniques for dynamically applying profile-guided optimization).

The profile-guided optimization component 620 may support optimizing runtime for a source code in accordance with examples as disclosed herein. For example, the profile-guided optimization component 620 may be configured to support identifying a set of functions for the source code associated with an uninterruptable software service. The profile-guided optimization component 620 may be configured to support creating a compilation template to compile a subset of the set of functions to a shared library. The profile-guided optimization component 620 may be configured to support performing an instrumentation to identify the subset of the set of functions based on the shared library. The profile-guided optimization component 620 may be configured to support creating an optimized version of the shared library based on performing the instrumentation. The profile-guided optimization component 620 may be configured to support changing one or more portions of the source code to repoint to the optimized version of the shared library based on creating the optimized version of the shared library.

By including or configuring the profile-guided optimization component 620 in accordance with examples as described herein, the device 605 may support techniques for optimizing run time of software codes.

Figure 7:
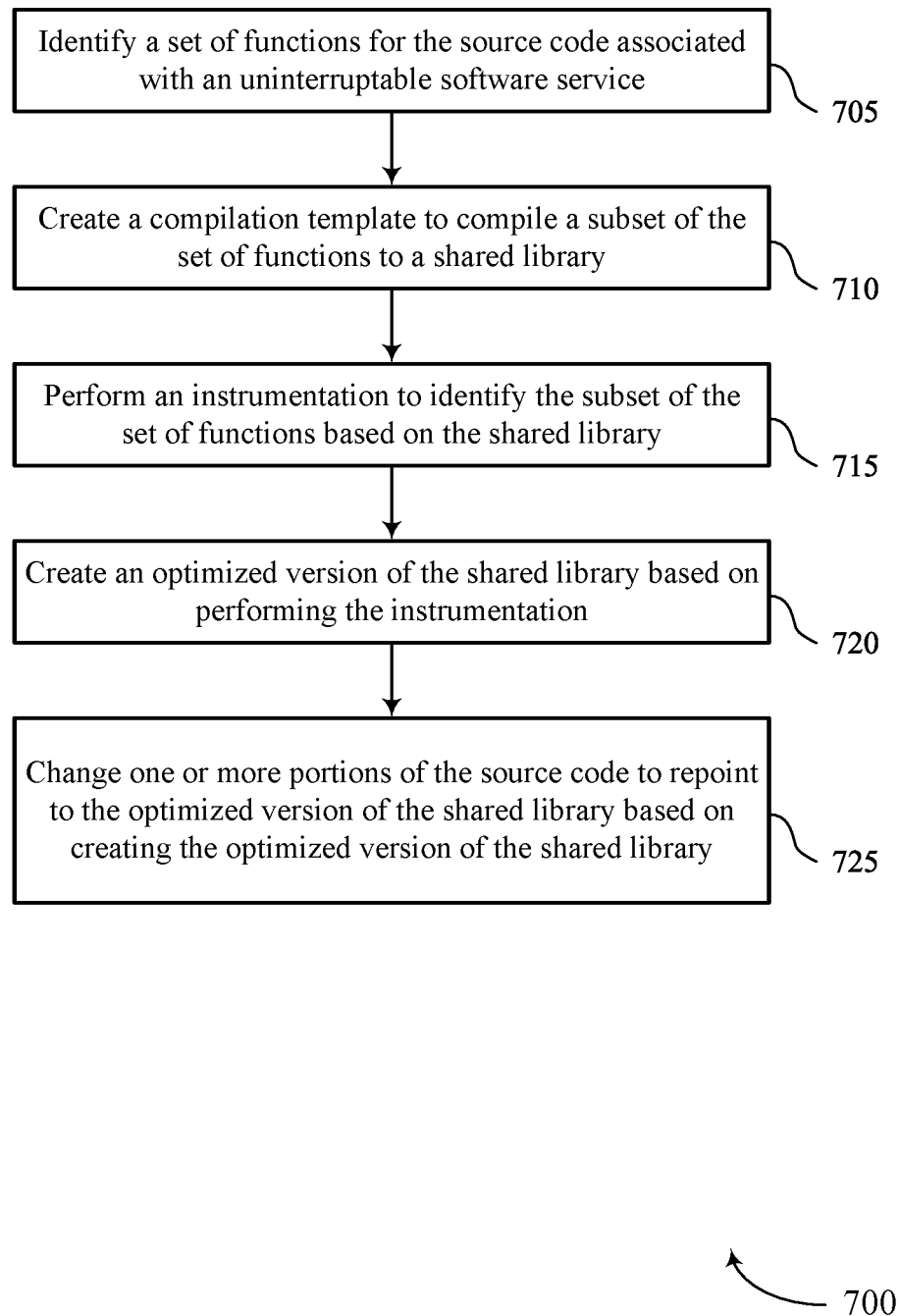
FIGS. 7 through 10 illustrate flowcharts showing methods that support techniques for dynamically applying profile-guided optimization in accordance with aspects of the present disclosure.

FIG. 7 illustrates a flowchart showing a method 700 that supports techniques for dynamically applying profile-guided optimization in accordance with aspects of the present disclosure. The operations of the method 700 may be implemented by an application server or its components as described herein. For example, the operations of the method 700 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 705, the method may include identifying a set of functions for the source code associated with an uninterruptable software service. The operations of 705 may be performed in accordance with examples as disclosed herein. In some examples, aspects of the operations of 705 may be performed by a function identification component 525 as described with reference to FIG. 5.

At 710, the method may include creating a compilation template to compile a subset of the set of functions to a shared library. The operations of 710 may be performed in accordance with examples as disclosed herein. In some examples, aspects of the operations of 710 may be performed by a compilation component 530 as described with reference to FIG. 5.

At 715, the method may include performing an instrumentation to identify the subset of the set of functions based on the shared library. The operations of 715 may be performed in accordance with examples as disclosed herein. In some examples, aspects of the operations of 715 may be performed by an instrumentation component 535 as described with reference to FIG. 5.

At 720, the method may include creating an optimized version of the shared library based on performing the instrumentation. The operations of 720 may be performed in accordance with examples as disclosed herein. In some examples, aspects of the operations of 720 may be performed by an optimization component 540 as described with reference to FIG. 5.

At 725, the method may include changing one or more portions of the source code to repoint to the optimized version of the shared library based on creating the optimized version of the shared library. In some examples, at runtime, the change in one or more portions of the source code may include change in address of one or more symbols. The operations of 725 may be performed in accordance with examples as disclosed herein. In some examples, aspects of the operations of 725 may be performed by a source code component 545 as described with reference to FIG. 5.

Figure 8:
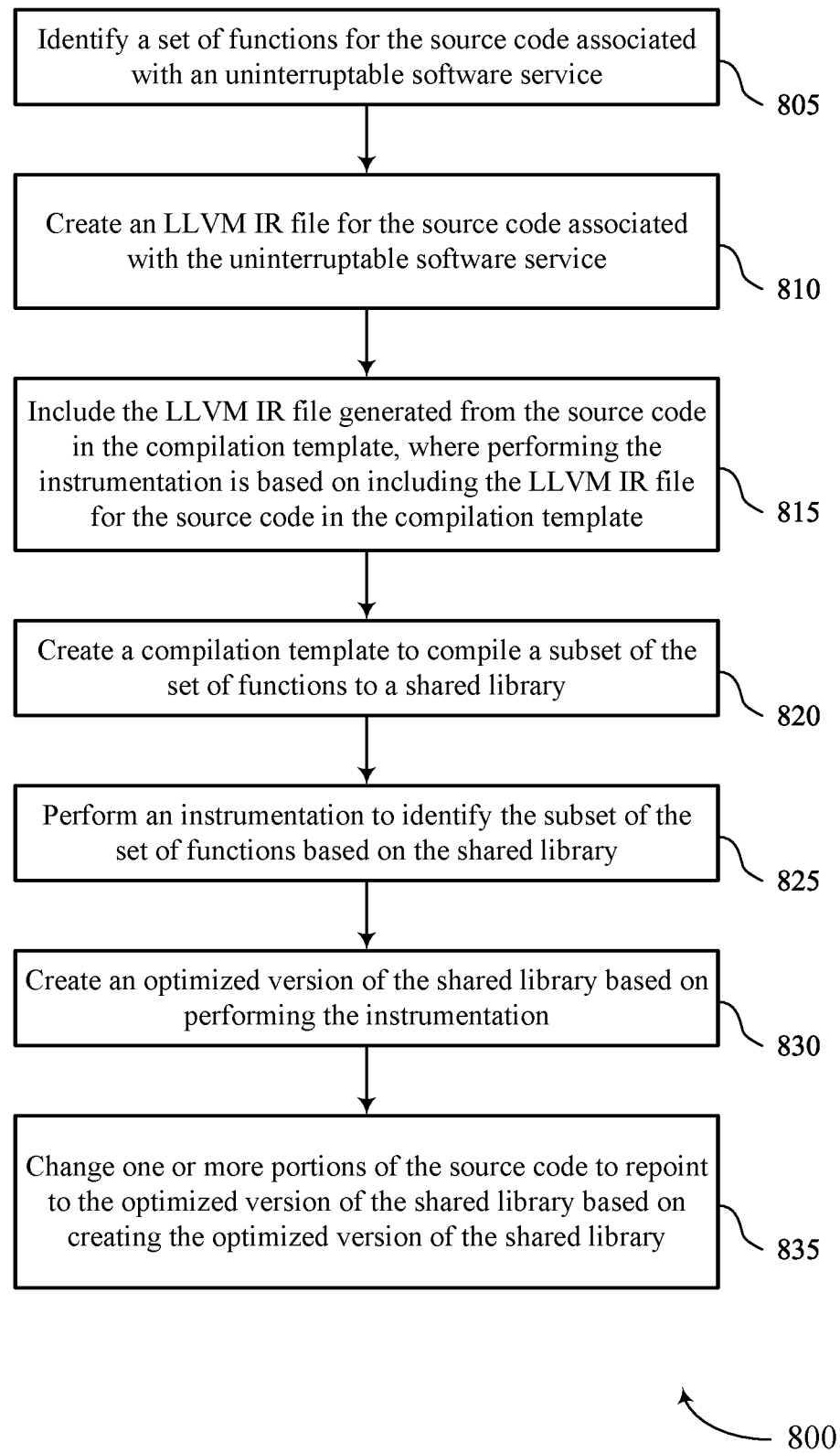

FIG. 8 illustrates a flowchart showing a method 800 that supports techniques for dynamically applying profile-guided optimization in accordance with aspects of the present disclosure. The operations of the method 800 may be implemented by an application server or its components as described herein. For example, the operations of the method 800 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 805, the method may include identifying a set of functions for the source code associated with an uninterruptable software service. The operations of 805 may be performed in accordance with examples as disclosed herein. In some examples, aspects of the operations of 805 may be performed by a function identification component 525 as described with reference to FIG. 5.

At 810, the method may include creating an LLVM IR file for the source code associated with the uninterruptable software service. The operations of 810 may be performed in accordance with examples as disclosed herein. In some examples, aspects of the operations of 810 may be performed by a file generation component 550 as described with reference to FIG. 5.

At 815, the method may include including the LLVM IR file generated from the source code in the compilation template, where performing the instrumentation is based on including the LLVM IR file for the source code in the compilation template. The operations of 815 may be performed in accordance with examples as disclosed herein. In some examples, aspects of the operations of 815 may be performed by a file generation component 550 as described with reference to FIG. 5.

At 820, the method may include creating a compilation template to compile a subset of the set of functions to a shared library. The operations of 820 may be performed in accordance with examples as disclosed herein. In some examples, aspects of the operations of 820 may be performed by a compilation component 530 as described with reference to FIG. 5.

At 825, the method may include performing an instrumentation to identify the subset of the set of functions based on the shared library. The operations of 825 may be performed in accordance with examples as disclosed herein. In some examples, aspects of the operations of 825 may be performed by an instrumentation component 535 as described with reference to FIG. 5.

At 830, the method may include creating an optimized version of the shared library based on performing the instrumentation. The operations of 830 may be performed in accordance with examples as disclosed herein. In some examples, aspects of the operations of 830 may be performed by an optimization component 540 as described with reference to FIG. 5.

At 835, the method may include changing one or more portions of the source code to repoint to the optimized version of the shared library based on creating the optimized version of the shared library. The operations of 835 may be performed in accordance with examples as disclosed herein. In some examples, aspects of the operations of 835 may be performed by a source code component 545 as described with reference to FIG. 5.

Figure 9:
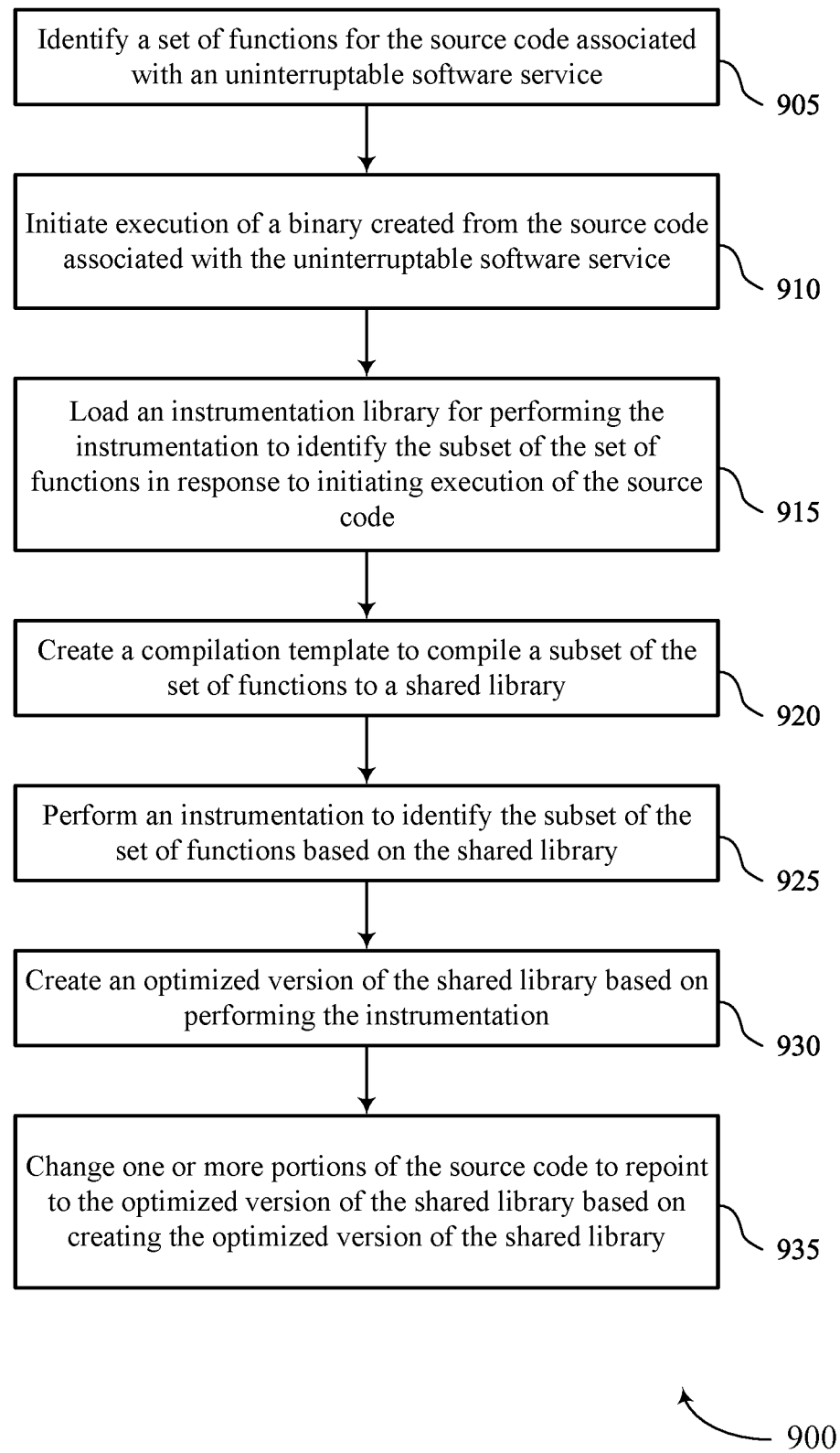

FIG. 9 illustrates a flowchart showing a method 900 that supports techniques for dynamically applying profile-guided optimization in accordance with aspects of the present disclosure. The operations of the method 900 may be implemented by an application server or its components as described herein. For example, the operations of the method 900 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 905, the method may include identifying a set of functions for the source code associated with an uninterruptable software service. The operations of 905 may be performed in accordance with examples as disclosed herein. In some examples, aspects of the operations of 905 may be performed by a function identification component 525 as described with reference to FIG. 5.

At 910, the method may include initiating execution of a binary created from the source code associated with the uninterruptable software service. The operations of 910 may be performed in accordance with examples as disclosed herein. In some examples, aspects of the operations of 910 may be performed by a binary execution component 555 as described with reference to FIG. 5.

At 915, the method may include loading an instrumentation library for performing the instrumentation to identify the subset of the set of functions in response to initiating execution of the source code. The operations of 915 may be performed in accordance with examples as disclosed herein. In some examples, aspects of the operations of 915 may be performed by an instrumentation component 535 as described with reference to FIG. 5.

At 920, the method may include creating a compilation template to compile a subset of the set of functions to a shared library. The operations of 920 may be performed in accordance with examples as disclosed herein. In some examples, aspects of the operations of 920 may be performed by a compilation component 530 as described with reference to FIG. 5.

At 925, the method may include performing an instrumentation to identify the subset of the set of functions based on the shared library. The operations of 925 may be performed in accordance with examples as disclosed herein. In some examples, aspects of the operations of 925 may be performed by an instrumentation component 535 as described with reference to FIG. 5.

At 930, the method may include creating an optimized version of the shared library based on performing the instrumentation. The operations of 930 may be performed in accordance with examples as disclosed herein. In some examples, aspects of the operations of 930 may be performed by an optimization component 540 as described with reference to FIG. 5.

At 935, the method may include changing one or more portions of the source code to repoint to the optimized version of the shared library based on creating the optimized version of the shared library. The operations of 935 may be performed in accordance with examples as disclosed herein. In some examples, aspects of the operations of 935 may be performed by a source code component 545 as described with reference to FIG. 5.

Figure 10:
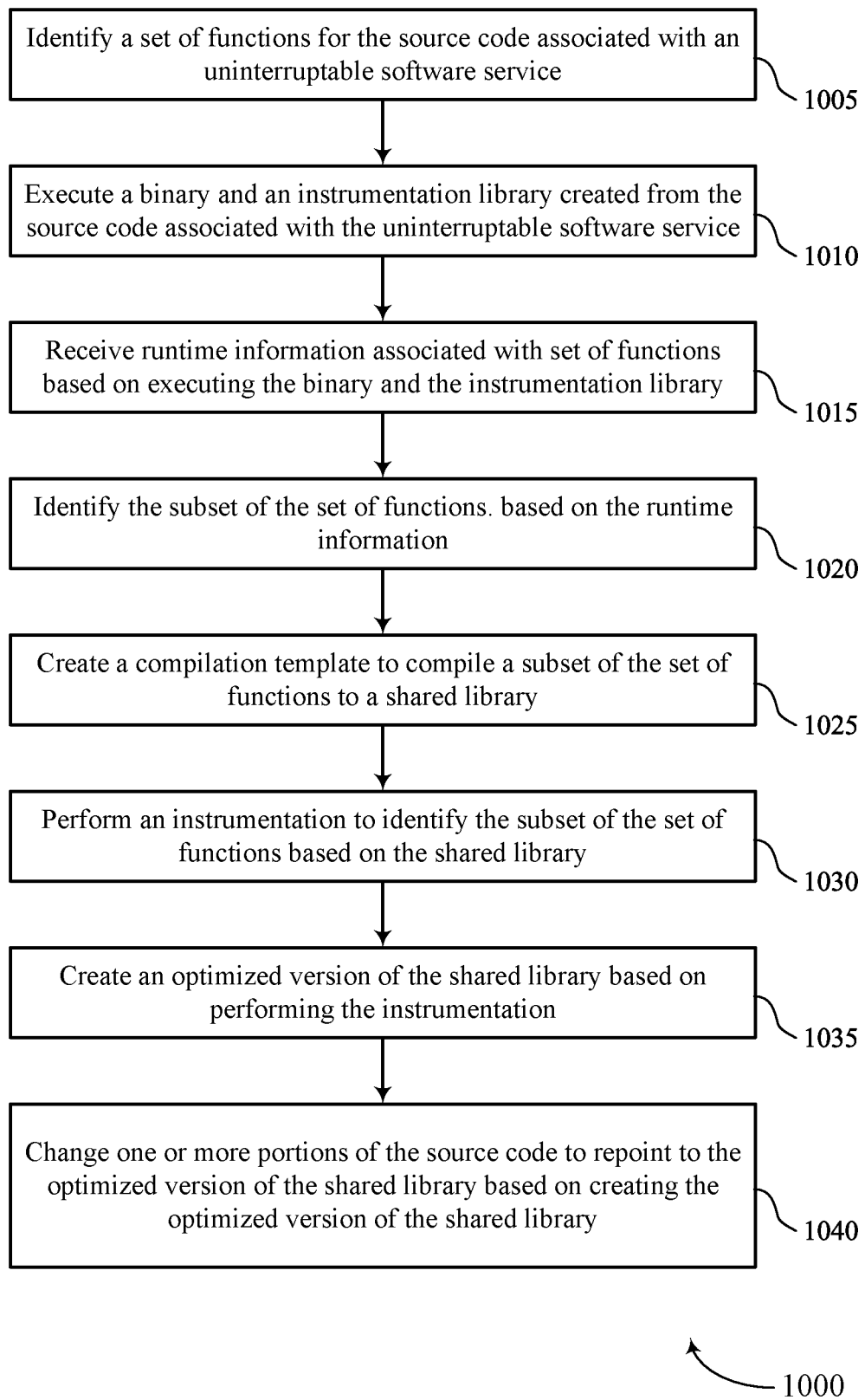

FIG. 10 illustrates a flowchart showing a method 1000 that supports techniques for dynamically applying profile-guided optimization in accordance with aspects of the present disclosure. The operations of the method 1000 may be implemented by an application server or its components as described herein. For example, the operations of the method 1000 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 1005, the method may include identifying a set of functions for the source code associated with an uninterruptable software service. The operations of 1005 may be performed in accordance with examples as disclosed herein. In some examples, aspects of the operations of 1005 may be performed by a function identification component 525 as described with reference to FIG. 5.

At 1010, the method may include executing a binary and an instrumentation library created from the source code associated with the uninterruptable software service. The operations of 1010 may be performed in accordance with examples as disclosed herein. In some examples, aspects of the operations of 1010 may be performed by a source code component 545 as described with reference to FIG. 5.

At 1015, the method may include receiving runtime information associated with set of functions based on executing the binary and the instrumentation library. The operations of 1015 may be performed in accordance with examples as disclosed herein. In some examples, aspects of the operations of 1015 may be performed by a source code component 545 as described with reference to FIG. 5.

At 1020, the method may include identifying the subset of the set of functions. based on the runtime information. The operations of 1020 may be performed in accordance with examples as disclosed herein. In some examples, aspects of the operations of 1020 may be performed by a function identification component 525 as described with reference to FIG. 5.

At 1025, the method may include creating a compilation template to compile a subset of the set of functions to a shared library. The operations of 1025 may be performed in accordance with examples as disclosed herein. In some examples, aspects of the operations of 1025 may be performed by a compilation component 530 as described with reference to FIG. 5.

At 1030, the method may include performing an instrumentation to identify the subset of the set of functions based on the shared library. The operations of 1030 may be performed in accordance with examples as disclosed herein. In some examples, aspects of the operations of 1030 may be performed by an instrumentation component 535 as described with reference to FIG. 5.

At 1035, the method may include creating an optimized version of the shared library based on performing the instrumentation. The operations of 1035 may be performed in accordance with examples as disclosed herein. In some examples, aspects of the operations of 1035 may be performed by an optimization component 540 as described with reference to FIG. 5.

At 1040, the method may include changing one or more portions of the source code to repoint to the optimized version of the shared library based on creating the optimized version of the shared library. The operations of 1040 may be performed in accordance with examples as disclosed herein. In some examples, aspects of the operations of 1040 may be performed by a source code component 545 as described with reference to FIG. 5.

A method for optimizing runtime for a source code is described. The method may include identifying a set of functions for the source code associated with an uninterruptable software service, creating a compilation template to compile a subset of the set of functions to a shared library, performing an instrumentation to identify the subset of the set of functions based on the shared library, creating an optimized version of the shared library based on performing the instrumentation, and changing one or more portions of the source code to repoint to the optimized version of the shared library based on creating the optimized version of the shared library.

An apparatus for optimizing runtime for a source code is described. The apparatus may include a processor, memory coupled with the processor, and instructions stored in the memory. The instructions may be executable by the processor to cause the apparatus to identify a set of functions for the source code associated with an uninterruptable software service, create a compilation template to compile a subset of the set of functions to a shared library, perform an instru-mentation to identify the subset of the set of functions based on the shared library, create an optimized version of the shared library based on performing the instrumentation, and change one or more portions of the source code to repoint to the optimized version of the shared library based on creating the optimized version of the shared library.

Another apparatus for optimizing runtime for a source code is described. The apparatus may include means for identifying a set of functions for the source code associated with an uninterruptable software service, means for creating a compilation template to compile a subset of the set of functions to a shared library, means for performing an instrumentation to identify the subset of the set of functions based on the shared library, means for creating an optimized version of the shared library based on performing the instrumentation, and means for changing one or more portions of the source code to repoint to the optimized version of the shared library based on creating the optimized version of the shared library.

A non-transitory computer-readable medium storing code for optimizing runtime for a source code is described. The code may include instructions executable by a processor to identify a set of functions for the source code associated with an uninterruptable software service, create a compilation template to compile a subset of the set of functions to a shared library, perform an instrumentation to identify the subset of the set of functions based on the shared library, create an optimized version of the shared library based on performing the instrumentation, and change one or more portions of the source code to repoint to the optimized version of the shared library based on creating the optimized version of the shared library.

Some examples of the method, apparatuses, and non-transitory computer-readable medium described herein may further include operations, features, means, or instructions for creating a low level virtual machine (LLVM) intermediate representation (IR) file for the source code associated with the uninterruptable software service and including the LLVM IR file generated from the source code in the compilation template, where performing the instrumentation may be based on including the LLVM IR file for the source code in the compilation template.

Some examples of the method, apparatuses, and non-transitory computer-readable medium described herein may further include operations, features, means, or instructions for compiling and linking the LLVM IR file with profile data associated with the source code by incorporating an instrumentation logic into the LLVM IR file, where creating the optimized version of the shared library may be based on compiling and linking the LLVM IR file with the profile data.

Some examples of the method, apparatuses, and non-transitory computer-readable medium described herein may further include operations, features, means, or instructions for initiating execution of a binary created from the source code associated with the uninterruptable software service and loading an instrumentation library for performing the instrumentation to identify the subset of the set of functions in response to initiating execution of the source code.

In some examples of the method, apparatuses, and non-transitory computer-readable medium described herein, the instrumentation library includes at least a set of functions that may be also included in a primary version of the binary for the source code.

Some examples of the method, apparatuses, and non-transitory computer-readable medium described herein may further include operations, features, means, or instructions for initiating a global pointer for a first address associated with a function in an original binary in the uninterruptable software service and reassigning the global pointer to a second address associated with the function in the optimized version of the shared library, where changing the one or more portions of the source code may be based on reassigning the global pointer.

Some examples of the method, apparatuses, and non-transitory computer-readable medium described herein may further include operations, features, means, or instructions for reconfiguring the global pointer to point to the first address associated with the function.

Some examples of the method, apparatuses, and non-transitory computer-readable medium described herein may further include operations, features, means, or instructions for executing a binary and an instrumentation library created from the source code associated with the uninterruptable software service, receiving runtime information associated with set of functions based on executing the binary and the instrumentation library, and identifying the subset of the set of functions. based on the runtime information.

In some examples of the method, apparatuses, and non-transitory computer-readable medium described herein, the runtime information includes at least one of a number of times a function may be executed, a frequently invoked function call, a number of iterations of a loop, or a combination thereof.

In some examples of the method, apparatuses, and non-transitory computer-readable medium described herein, the subset of the set of functions includes one or more functions having a computational expense greater than a threshold.

The following provides an overview of aspects of the present disclosure:

Aspect 1: A method for optimizing runtime for a source code, comprising: identifying a set of functions for the source code associated with an uninterruptable software service: creating a compilation template to compile a subset of the set of functions to a shared library: performing an instrumentation to identify the subset of the set of functions based at least in part on the shared library: creating an optimized version of the shared library based at least in part on performing the instrumentation: and changing one or more portions of the source code to repoint to the optimized version of the shared library based at least in part on creating the optimized version of the shared library.

Aspect 2: The method of aspect 1, further comprising: creating a low level virtual machine (LLVM) intermediate representation (IR) file for the source code associated with the uninterruptable software service: and including the LLVM IR file generated from the source code in the compilation template, wherein performing the instrumentation is based at least in part on including the LLVM IR file for the source code in the compilation template.

Aspect 3: The method of aspect 2, further comprising: compiling and linking the LLVM IR file with profile data associated with the source code by incorporating an instrumentation logic into the LLVM IR file, wherein creating the optimized version of the shared library is based at least in part on compiling and linking the LLVM IR file with the profile data.

Aspect 4: The method of any of aspects 1 through 3, further comprising: initiating execution of a binary created from the source code associated with the uninterruptable software service: and loading an instrumentation library for performing the instrumentation to identify the subset of the set of functions in response to initiating execution of the source code.

Aspect 5: The method of aspect 4, wherein the instrumentation library comprises at least a set of functions that are also included in a primary version of the binary for the source code.

Aspect 6: The method of any of aspects 1 through 5, further comprising: initiating a global pointer for a first address associated with a function in an original binary in the uninterruptable software service: and reassigning the global pointer to a second address associated with the function in the optimized version of the shared library, wherein changing the one or more portions of the source code is based at least in part on reassigning the global pointer.

Aspect 7: The method of aspect 6, further comprising: reconfiguring the global pointer to point to the first address associated with the function.

Aspect 8: The method of any of aspects 1 through 7, further comprising: executing a binary and an instrumentation library created from the source code associated with the uninterruptable software service; receiving runtime information associated with set of functions based at least in part on executing the binary and the instrumentation library: and identifying the subset of the set of functions. based at least in part on the runtime information.

Aspect 9: The method of aspect 8, wherein the runtime information comprises at least one of a number of times a function is executed, a frequently invoked function call, a number of iterations of a loop, or a combination thereof.

Aspect 10: The method of any of aspects 1 through 9, wherein the subset of the set of functions comprises one or more functions having a computational expense greater than a threshold.

Aspect 11: An apparatus for optimizing runtime for a source code, comprising a processor: memory coupled with the processor: and instructions stored in the memory and executable by the processor to cause the apparatus to perform a method of any of aspects 1 through 10.

Aspect 12: An apparatus for optimizing runtime for a source code, comprising at least one means for performing a method of any of aspects 1 through 10.

Aspect 13: A non-transitory computer-readable medium storing code for optimizing runtime for a source code, the code comprising instructions executable by a processor to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples," The detailed description includes specific details for the purpose of providing an understanding of the described techniques. These techniques, however, may be practiced without these specific details. In some instances, well-known structures and devices are shown in block diagram form in order to avoid obscuring the concepts of the described examples, In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for optimizing runtime for a source code, comprising:
   identifying a set of functions for the source code associated with an uninterruptable software service;
   identifying a subset of the set of functions based at least in part on an amount of computational resources utilized by the subset of the set of functions being greater than an amount of computational resources utilized by a remaining subset of the set of functions;
   creating a compilation template to compile the subset of the set of functions to a shared library;
   performing an instrumentation to identify the subset of the set of functions based at least in part on the shared library;
   creating an optimized version of the shared library based at least in part on performing the instrumentation; and
   changing one or more portions of the source code to repoint to the optimized version of the shared library based at least in part on creating the optimized version of the shared library.

2. The method of claim 1, further comprising:
   creating a low level virtual machine (LLVM) intermediate representation (IR) file for the source code associated with the uninterruptable software service; and
   including the LLVM IR file generated from the source code in the compilation template, wherein performing the instrumentation is based at least in part on including the LLVM IR file for the source code in the compilation template.

3. The method of claim 2, further comprising:
   compiling and linking the LLVM IR file with profile data associated with the source code by incorporating an instrumentation logic into the LLVM IR file, wherein creating the optimized version of the shared library is based at least in part on compiling and linking the LLVM IR file with the profile data.

4. The method of claim 1, further comprising:
   initiating execution of a binary created from the source code associated with the uninterruptable software service; and loading an instrumentation library for performing the instrumentation to identify the subset of the set of functions in response to initiating execution of the source code.

5. The method of claim 4, wherein the instrumentation library comprises at least a set of functions that are also included in a primary version of the binary for the source code.

6. The method of claim 1, further comprising:
initiating a global pointer for a first address associated with a function in an original binary in the uninterruptable software service; and
reassigning the global pointer to a second address associated with the function in the optimized version of the shared library, wherein changing the one or more portions of the source code is based at least in part on reassigning the global pointer.

7. The method of claim 6, further comprising:
reconfiguring the global pointer to point to the first address associated with the function.

8. The method of claim 1, further comprising:
executing a binary and an instrumentation library created from the source code associated with the uninterruptable software service;
receiving runtime information associated with a set of functions based at least in part on executing the binary and the instrumentation library; and
identifying the subset of the set of functions based at least in part on the runtime information.

9. The method of claim 8, wherein the runtime information comprises at least one of a number of times a function is executed, a frequently invoked function call, a number of iterations of a loop, or a combination thereof.

10. The method of claim 1, wherein the subset of the set of functions comprises one or more functions having a computational expense greater than a threshold.

11. An apparatus for optimizing runtime for a source code, comprising:
a processor,
memory coupled with the processor; and
instructions stored in the memory and executable by the processor to cause the apparatus to:
identify a set of functions for the source code associated with an uninterruptable software service;
identify a subset of the set of functions based at least in part on an amount of computational resources utilized by the subset of the set of functions being greater than an amount of computational resources utilized by a remaining subset of the set of functions;
create a compilation template to compile the subset of the set of functions to a shared library;
perform an instrumentation to identify the subset of the set of functions based at least in part on the shared library;
create an optimized version of the shared library based at least in part on performing the instrumentation; and
change one or more portions of the source code to repoint to the optimized version of the shared library based at least in part on creating the optimized version of the shared library.

12. The apparatus of claim 11, wherein the instructions are further executable by the processor to cause the apparatus to:
create a low level virtual machine (LLVM) intermediate representation (IR) file for the source code associated with the uninterruptable software service; and
include the LLVM IR file generated from the source code in the compilation template, wherein performing the instrumentation is based at least in part on including the LLVM IR file for the source code in the compilation template.

13. The apparatus of claim 12, wherein the instructions are further executable by the processor to cause the apparatus to:
compile and link the LLVM IR file with profile data associated with the source code by incorporating an instrumentation logic into the LLVM IR file, wherein creating the optimized version of the shared library is based at least in part on compiling and linking the LLVM IR file with the profile data.

14. The apparatus of claim 11, wherein the instructions are further executable by the processor to cause the apparatus to:
initiate execution of a binary created from the source code associated with the uninterruptable software service; and
load an instrumentation library for performing the instrumentation to identify the subset of the set of functions in response to initiating execution of the source code.

15. The apparatus of claim 14, wherein the instrumentation library comprises at least a set of functions that are also included in a primary version of the binary for the source code.

16. The apparatus of claim 11, wherein the instructions are further executable by the processor to cause the apparatus to:
initiate a global pointer for a first address associated with a function in an original binary in the uninterruptable software service; and
reassign the global pointer to a second address associated with the function in the optimized version of the shared library, wherein changing the one or more portions of the source code is based at least in part on reassigning the global pointer.

17. The apparatus of claim 16, wherein the instructions are further executable by the processor to cause the apparatus to:
reconfigure the global pointer to point to the first address associated with the function.

18. The apparatus of claim 11, wherein the instructions are further executable by the processor to cause the apparatus to:
execute a binary and an instrumentation library created from the source code associated with the uninterruptable software service;
receive runtime information associated with a set of functions based at least in part on executing the binary and the instrumentation library; and
identify the subset of the set of functions based at least in part on the runtime information.

19. A non-transitory computer-readable medium storing code for optimizing runtime for a source code, the code comprising instructions executable by a processor to:
identify a set of functions for the source code associated with an uninterruptable software service;
identify a subset of the set of functions based at least in part on an amount of computational resources utilized by the subset of the set of functions being greater than an amount of computational resources utilized by a remaining subset of the set of functions;
create a compilation template to compile the subset of the set of functions to a shared library;
perform an instrumentation to identify the subset of the set of functions based at least in part on the shared library;
create an optimized version of the shared library based at least in part on performing the instrumentation; and change one or more portions of the source code to repoint to the optimized version of the shared library based at least in part on creating the optimized version of the shared library.

20. The non-transitory computer-readable medium of claim 19, wherein the instructions are further executable by the processor to:

create a low level virtual machine (LLVM) intermediate representation (IR) file for the source code associated with the uninterruptable software service; and include the LLVM IR file generated from the source code in the compilation template, wherein performing the instrumentation is based at least in part on including the LLVM IR file for the source code in the compilation template.

\* \* \* \* \*